United States Patent [19]

Dunn, Jr.

[11] 4,363,789
[45] Dec. 14, 1982

[54] ALUMINA PRODUCTION VIA ALUMINUM CHLORIDE OXIDATION

[75] Inventor: Wendell E. Dunn, Jr., Spearfish, S. Dak.

[73] Assignee: Reynolds Metals Company Richmond, Va.

[21] Appl. No.: 255,639

[22] Filed: Apr. 20, 1981

[51] Int. Cl.³ .................. C01G 35/00; C01G 33/08; C01F 7/56; C01G 49/10
[52] U.S. Cl. .................................. 423/79; 423/74; 423/135; 423/136; 423/343; 423/149; 423/463; 423/500; 423/504
[58] Field of Search ............. 423/111, 133, 135, 136, 423/496, 463, 500, 504, 74, 79, 343

[56] References Cited

U.S. PATENT DOCUMENTS

| | | | |
|---|---|---|---|
| 1,528,039 | 3/1925 | Wolcott | 423/135 |
| 1,600,216 | 9/1926 | Dearborn | 423/136 |
| 1,605,098 | 11/1926 | Dearborn | 423/126 |
| 1,875,105 | 8/1932 | Muggleton et al. | 423/136 |
| 1,982,194 | 11/1934 | Brode et al. | 423/136 |
| 3,627,483 | 12/1971 | Cole et al. | 423/135 |
| 3,865,920 | 2/1975 | Dunn | 423/74 |
| 3,887,694 | 6/1975 | Dunn | 423/504 |

FOREIGN PATENT DOCUMENTS

| | | | |
|---|---|---|---|
| 713192 | 8/1954 | United Kingdom | 423/111 |
| 470499 | 8/1972 | U.S.S.R. | 423/111 |

Primary Examiner—Herbert T. Carter
Attorney, Agent, or Firm—Lyne, Girard & McDonald

[57] ABSTRACT

A method for producing alumina from a material containing alumina values via a chlorination step which process comprises the steps of:

(A) dehydrating the material, if necessary, at a temperature of between about 500 and about 1300° K.;

(B) chlorinating the product of step (A) in the presence of chlorine and carbon at a temperature below about 1200° K. and under conditions which provide chlorination of a majority of the iron present in the clay without substantial chlorination of titania values which may be present therein with concommittant formation of an iron chloride cloud above the surface of the chlorination reaction mixture;

(C) introducing oxygen into the iron chloride cloud under conditions to cause oxidation of a majority of the iron chloride contained in the cloud;

(D) chlorinating the non-gaseous product of step (B) in the presence of chlorine and carbon at a temperature above about 1300° K. but below the fusion temperature of silica containing components and under conditions sufficient to chlorinate substantially entirely the alumina, titania and silica values contained therein;

(E) reducing and condensing any iron chloride contained with the aluminum chloride in one or more partial iron chloride condensation stages;

(F) absorbing the aluminum chloride under high temperature conditions with an alkali chloride or mixture of alkali chlorides to form an ionic alkali metal aluminum chloride complex;

(G) selectively condensing any impurity chlorides contained in the product of step (F) to produce a purified aluminum chloride-alkali chloride complex;

(H) oxidizing the alkali metal/aluminum chloride complex with oxygen at a temperature above about 500° C. in a fluidized bed pebble reactor; and (I) separating the solid alumina product.

1 Claim, No Drawings

ALUMINA PRODUCTION VIA ALUMINUM CHLORIDE OXIDATION

FIELD OF THE INVENTION

This invention pertains to a process for making aluminum oxide from aluminum value containing materials such as fly ash, bauxite, clay etc. through a process which involves the formation of an aluminum chloride intermediate.

BACKGROUND OF THE INVENTION

The growing scarcity of conventional bauxites suitable for Bayer process production of alumina has generated a search for other sources of aluminum values and other methods of processing the variety of aluminum value sources that exist including low grade bauxites, kaolins, fly ash and other aluminum value containing ores and materials. One such approach involves the chlorination of such aluminum value containing materials followed by direct hydrolysis of the aluminum chloride thus formed, or alternatively, decomposition of the $AlCl_3$ into alumina which can be used in conventional electrolytic cells.

Energy considerations appear to favor high temperature chlorination as a route to aluminum chloride which can be oxidized to obtain alumina and recover the chlorine values for recycle. The commercially successful titanium chloride pigment process has demonstrated the effectiveness of a recycle process using high temperature chlorination with a solid reducing agent followed by separation of the titanium tetrachloride from the accompanying noncondensible chlorinator gases and purification before oxidation.

Researchers seeking to save energy in the electrolytic reduction step of aluminum production by using aluminum chloride instead of alumina in the cell reduction have found that $AlCl_3$ purification difficulties have to date dictated that alumina be the starting material for the production of the chloride instead of natural bauxite ores or other aluminum value containing materials which also incorporate substantial quantities of various impurities. Hence there has been a twofold need for a process to produce alumina, both as a material to be chlorinated via a chloride reduction route to aluminum metal and as the starting material for direct reduction in conventional cells. When one considers the huge investment in plants now using alumina as the source of aluminum metal, it is obvious that steps must be taken to provide a continuing source of alumina even as the grade and type of aluminum value sources changes. A process which could provide such a source of alumina while at the same time possessing the capability of providing $AlCl_3$ for chloride reduction cells would seem to provide an optimum solution to the problem.

Studies have been made and process steps proposed to perchlorinate bauxites or kaolins to remove one or more impurities, usually iron oxides and sometimes titania; frequently using HCl and sometimes a limited amount of chlorine with a reducing agent, frequently carbon monoxide. The attempts to remove iron fall far short of reaching the alumina purity which is necessary for producing "cell grade" material.

Proposals have been made to selectively condense the chlorides from a chlorinator exit gas stream, but it is now well established that the formation of iron-aluminum chloride complexes will invariably defeat attempts at simple selective condensation. Not only has the iron impurity level remained excessive in such attempts, but it is generally found that the concentration of titanium and silicon chlorides in the condensed aluminum chloride is much higher than would be expected from the wide temperature differences in their boiling points and certainly higher than can be tolerated in the electrolytic cells.

Proposals have been made to rectify a molten mixture of chlorides, but the corrosive nature of aluminum chloride makes heat transfer across metal surfaces difficult and the propensity of ferric and aluminum chloride to attack carbon by forming intercalation compounds makes the use of generally more corrosion resistant carbon-containing materials virtually impossible. The low price of aluminas, furthermore, inveighs against the energy expenditure for rectification.

In processes analogous to the chloride titanium pigment process which are proposed to produce pigment-sized aluminas, the jet burners needed are not only complex and expensive but produce a very fine alumina which is difficult to collect and handle. The surface areas are below the high surface areas made from aluminum chloride or hydroxide dehydration as in the Bayer process, but the particle size is generally too small for easy handling and cell introduction.

Finally, efforts to recycle chloride values from the impurities are faced with expensive separate oxidation equipment and a silica particle size problem even worse than that of the alumina oxidation reactors.

It is clear from the foregoing that a simple alumina producing analogue of the chloride pigment/chlorine recycle process is neither desirable nor commercially realistic. Aluminum chloride is too near ferric chloride in physical properties, too difficult to separate from ferric chloride, too different in its oxidation properties and the alumina to be produced is too expensive a commodity to make a direct analog of the titania process economically viable.

OBJECTS OF THE INVENTION

It is therefore an object of this invention to provide an economically attractive chlorination process for the production of "cell grade" alumina from a variety of alumina value sources including, for example, bauxite, low grade ores such as clay and other less conventional sources such as fly ash.

And it is a further object of this invention to provide an economic process requiring low capital investment and operating costs as well as low energy requirements.

SUMMARY OF THE INVENTION

The present invention provides a process for producing alumina from a material containing alumina values via a chlorination step which process comprises the steps of:

(A) dehydrating the material, if necessary, at a temperature of between about 500° and about 1300° K.;
(B) chlorinating the product of step (A) in the presence of chlorine and carbon at a temperature below about 1200° K. and under conditions which provide chlorination of a majority of the iron present in the clay or other aluminas ore without substantial chlorination of titania values which may be present therein with concommittant formation of an iron chloride cloud above the surface of the chlorination reaction mixture;

(C) introducing oxygen into the iron chloride cloud under conditions to cause oxidation of a majority of the iron chloride contained in the cloud;

(D) chlorinating the non-gaseous product of step (b) in the presence of chlorine and carbon at a temperature above about 1300° K. but below the fusion temperature of silica containing components and under conditions sufficient to chlorinate substantially entirely the alumina, titania and silica values contained therein;

(E) reducing and condensing any iron chloride contained with the aluminum chloride in one or more partial iron chloride condensation stages;

(F) absorbing the aluminum chloride under high temperature conditions with an alkali chloride or mixture of alkali chlorides to form an ionic alkali metal aluminum chloride complex;

(G) selectively condensing the product of step (F) to produce a purified aluminum chloride-alkali chloride complex;

(H) oxidizing the alkali metal/aluminum chloride complex with oxygen at a temperature above about 500° C. in a fluidized bed pebble reactor; and (I) separating the solid alumina product.

DETAILED DESCRIPTION

In the following description, numerous parameters such as times of reaction, temperature, pressures, reactor dimensions, reagent concentration etc. are presented. It should be apparent that these parameters are specified for certain conditions of operation and that the skilled artisan can evolve procedures and sets of parameters outside of those specified. Thus, unless stated as necessary or essential the parameters specified should be considered primarily as exemplary operative conditions which are optional and whose modification is well within the skill of art once the process described is made available.

This invention comprises a process which takes an alumina value containing material, preferably a bauxite or clay, of fluidizable particle size, dehydrates it at a temperature of between about 500° and 1300° K., mixes it with portions of coal and coke and passes it into a staged fluidized bed where the ore is dehydrated and brought to a desired temperature to maintain heat balance in a succeeding reactor, i.e. a 1st chlorinator, where the ore is *partially* chlorinated.

Under certain circumstances, as an energy-saving measure, it may be desirable to preheat the alumina value source material prior to dehydration. Such a preheating step would be performed in a fluidized bed. The function of such a step is to raise the temperature of the material to somewhat below the level at which dehydration would occur to achieve drying, but not dehydration. Such a drying or preheat would be performed at a temperature above about 110° C. and preferably between about 250° C. and the temperature of the dehydration stage. Heat values for such preheating might be derived from other stages of the process as will be described hereinafter.

Dehydration is simarly performed in a fluidized bed environment. Air may be used as the fluidizing medium or a mixture of nitrogen and oxygen. If the latter mixture is used care must be exercised not to use an excess of $O_2$ as this may result in sintering. A mixture of $N_2/O_2$ of 60/40% will provide optimum safe results.

Carbon in the form of coal or coke is introduced into the dehydration bed as a source of combustion for heat. Carbon addition in the range of from about 1 to about 25% of the total dehydration charge will produce satisfactory results. It is preferred to use a carbon charge of between about 15 and 25% and optimum results are obtained at a level of 20% carbon in the mix.

The temperature of the dehydration will of course depend to some extent on residence time; however, at commercially feasible residence times of from about ½ to about 1 hour, temperatures in the range of 500°–1300° K. provide useful results. It is preferred to operate the dehydration at a temperature above about 800° C. as this provides rapid dehydration and permits a commercially useful residence time.

The dehydrator can be operated at atmospheric pressure or under high pressures and the determination as to which condition is desirable for a particular operation is well within the skill of the art.

In the first chlorinator the ore-carbon mixture is attacked by chlorine introduced to fluidize the bed and react with the iron oxides selectively, according to the reaction

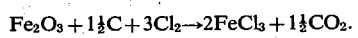

$$Fe_2O_3 + 1\tfrac{1}{2}C + 3Cl_2 \rightarrow 2FeCl_3 + 1\tfrac{1}{2}CO_2.$$

The degree of attack is regulated by the relative amounts of ore and chlorine introduced so that only iron and small amounts of titania are attacked, the residuals of these oxide impurities and the remaining alumina and silica are then passed to a second chlorinator along with the carbon which is in great excess over the amount needed to chlorinate only the iron but in stoichiometric balance to later accept all the oxygen released in the chlorination of the remaining ore.

The material present in this first chlorinator includes in addition to the alumina value source material carbon and the fluidizing and reacting chlorine. The carbon used in both this chlorinator and in the second chlorinator described below should have a surface area of between about 10 and 20 $FT^2/LB$, i.e. pass on $8 \times 52$ mesh. Carbon is present in the bed at from about 10 to about 30% by weight with 15–25% carbon by weight being preferred.

The fluidizing chlorine should be such as to produce a bed velocity of between about 0.03' and 1.25'/sec. It is generally preferred to operate the bed below about 1'/sec. The fluidization rate will of course, as with so many other of the parameters, depend upon the particle size distribution of the material under treatment, bed depth, etc. and that mentioned immediately hereinabove is largely exemplary and should not be interpreted as essential. Under normal conditions a positive pressure if between 20 PSIA and 3 atmospheres absolute should be applied to the bed to assure adequate process flow. Positive pressure will also assist the reaction kinetics and hence is desirable.

The temperature of this first chlorinator will depend to some extent on the dimension of the reactor vessel, the bed velocity and the character of the material being treated. Temperatures on the order of about 800° C. to about 1100° C. produce useful results under most operating conditions.

Bed depths of between about 2' and 8' produce satisfactory results. The function of this first stage chlorinator is defined as being able to accomplish chlorination and removal of substantially all of the iron present in the alumina value source without removal of any of the aluminum values. This is, of course, an ideal which to date has not been achieved. Consequently, the first chlorinator is operated under conditions which result in chlorination of at least about 80–85% of the iron in the alumina value source (hereinafter AUS) and preferably up to 98% of the iron. Because of the thermodynamics of the system the hierarchy of chlorination is as follows: Fe, Ti, Si and Al. If it is desired to recover TiCl₄ from the process stream as described hereinafter care must be exercised not to permit excessive chlorination of Ti in this first stage. In summary then what must be established in this first chlorinator is a set of reaction conditions which results in chlorination of about 80% or more of the iron and as much as the Titania as one is willing to lose. Si and Al chlorination must be minimized and the process parameters described hereinabove permit this level of Fe chlorination, although it is clearly possible to define alternative conditions which will yield desirable results.

The gases leaving the first chlorinator pass upward from the bed into a gas space above the reaches of the expanded fluidized bed wherein a second reaction is continually conducted, $$2FeCl_3 + 1\tfrac{1}{2}O_2 \rightarrow Fe_2O_3 + 3Cl_2.$$

This reaction is fed oxygen from one or more jets entering from the circumference of the reactor. The products from this reaction zone are ferric oxide, unreacted ferric chloride and dust from the carbon-ore mixture fluidized below. In addition, other oxidizable chlorides may be added to the cloud mixture to be oxidized simultaneously. In order to control the temperature, ferric chloride is recycled via feeding means after its condensation to absorb heat generated by the oxidation and any heat radiated from the chlorinator bed below. By control of the oxygen excess, it is possible to maintain a temperature high enough to accomplish rapid equilibration of the ferric chloride oxidation reaction and yet hold the gas space temperature to a reasonable operating margin above the rapid equilibration temperature. The detailed operation of a cloud reactor is described in Dunn's U.S. Pat. No. 3,865,920. Cloud temperatures on the order of between about 710° C. and about 1200° C. will achieve the required oxidation levels. Oxygen feed in reactors of the size and type described above on the order of will also provide useful results. Aforementioned U.S. Pat. No. 3,865,920 should be consulted for additional cloud oxidation reaction conditions and to this end this patent is incorporated herein by reference.

The gases exiting from the cloud may be cooled in a flue scrubbed by a separable scrubbing agent, such as coarse sand. After cooling to a temperature near but above the condensation temperature of the unreacted ferric chloride, i.e. about 400° C. the gases are cycloned to remove the ferric oxide, the other oxides made in the cloud, the scrubbing agents and dusts from the process which are introduced into the cloud along with condensed ferrous chloride, alumina chloride complex and ferric chloride from both the first and second reactors.

The gases passing to the cyclone via the scrubbed flue contain the unreacted ferric chloride (gaseous dimer), chlorine and combustion gas. The excess oxygen may be held to low values and may even be further reacted as the gases pass down the flue and are cooled because the equilibrium will shift favoring the oxide. As these gases are further cooled to below the condensation point of the unreacted ferric chloride, i.e. 300° C. the ferric chloride condenses to a solid which can be cycloned at the end of the scrubbed flue along with the additional scrubbing solids introduced. The solids should either be such that they can be separated from the fine condensed ferric chloride which is to be recycled or be solids which can be introduced into the cloud with the ferric chloride and which, being of large size, will fall into the fluidized bed below and constitute a feed stream.

The chlorine released by the oxidation of the ferric chloride and any other chlorides oxidized in the cloud is transported to the second chlorinator where it is comingled with the chlorine from the aluminum chloride oxidation and sent into the bed gas distributor.

Solids overflow from the first chlorinator is sent to the second chlorinator where the chlorination is continued, approaching total chlorination of the alumina, silica and titania remaining. An overflow is used to prevent build-up of the unchlorinatable materials introduced and to maintain a constant bed level. The bed will operate at an aluminum concentration close to the concentration entering the second reactor for ores which do not chlorinate selectively, i.e. at the concentration of the first reactor. This will be slightly above that of the preheated fresh ore since iron oxides have been substantially removed.

The second chlorinator is operated at a temperature close to the natural heat balance obtained from the heat of the reaction and the sensible heat of the ore and coke entering from the first reactor. The upper operating temperature limit, about 1150° C., is set by the approach to fusion of the silica component, but the operation of the reactor will not need to approach this temperature since the natural heat balance is well below this maximum temperature and there is no reason to increase the temperature excessively by oxygen addition. The second reactor can be operated at a temperature of between about 850° and 1150° C. with a preferred operating range of between about 950° and 1100° C.

The gaseous products of the second reactor, in addition to the desired aluminum chloride product, contain small amounts of ferric chloride, large amounts of combustion gas and silicon tetrachloride, lesser amounts of titanium tetrachloride and small amounts of chloride which has not reacted with the ore in passage through the bed. The amount of chlorine break-through will depend upon the temperature and depth of the bed but can be held to less than 2% of the chlorine fed. Control of bed depth to between about 2 to about 8 feet will limit sintering and minimize chlorine blowthrough. Bed velocities of between about 0.5 and 0.7′/sec. provide optimum results, but bed velocity may lie outside this range.

In order to avoid excessive iron condensing with the aluminum chloride in one of several complexes which can form and condense from the gas phase, the iron chloride is reduced by the addition of *metallic iron* or iron powder which rapidly converts at the high temperature existing above the bed to ferrous chloride by reacting with chlorine from the exiting gases as well as chlorine from the ferric chloride which is present.

Where the bed reactivity is sufficient it is possible to operate in a region where nearly all of the iron chloride produced is ferrous chloride, in which case the iron needed to reduce the remaining ferric chloride is much less. However, the amount will be small in either case and a convenient operating condition is sought to minimize both carbon consumption (affected by the CO₂/CO ratio of the combustion gas produced) and iron addition needed to reduce the ferric chloride and react with the chlorine breaking through the bed.

The advantage of iron addition is that it recaptures all of the chlorine as opposed to the addition of a hydrocarbon or hydrogen which would yield HCl. The iron powder may be produced by reduction of the iron oxide produced in the first step. Iron powder on the order of $10\mu$ is appropriate for this addition.

Following the iron addition, the gases pass into a scrubbed flue where the iron complexes of ferrous chloride and aluminum chloride condense. Here the wall temperature will stay at the condensation point of solid aluminum chloride, below 180° C., depending upon the system pressure. The gas temperature is kept well above the condensation point of aluminum chloride through the cyclone which removes the iron chloride complex, dust, and scrubbing solids. This complex chloride is returned to the cloud reactor to be oxidized. If the scrubbing solids used can serve as feed, e.g. large sized dried ore, they may accompany the iron chloride complex. If scrubbing solids which are not aluminous ore are used, these may be separated from the iron chloride complex by elutriation or pass through the system and overflow the second chlorinator and be removed before recycle of aluminum ore values. The latter has advantages for keeping control of bed heights and compositions.

Following the cyclone removing the iron complex, a fluidized condenser receives the gas stream and cools it to a point where appreciable condensation of the aluminum chloride takes place. Temperature is controlled by limiting the flow of coolant to the fluidized bed which is operated at high velocity (i.e. from about 1 to about 5 ft/sec) with large particles (i.e. from about 1/16" to about ¼") to keep heat transfer surfaces clean and elutriate the condensed aluminum chloride. This first aluminum chloride cut is recycled to the second chlorinator chlorine feed stream to act as a catalyst for the reaction. The function of the aluminum chloride recycle is to remove all traces of any solid aluminum chloride-iron chloride complex that might have passed the earlier cyclone.

At the end of the flue entering the condenser, the gaseous product should be at a temperature of about 260° C., well above the temperature at which $AlCl_3$ will condense. This latter temperature will depend to great extent on the vapor pressure of the components, especially $AlCl_3$ in the gas and can only be regulated in balance with that pressure.

It is the aim of this condensation stage to condense all of the iron values present in the gas and between about 10 and 20% of the $AlCl_3$ to insure total iron removal. At a condensation temperature of about 160° C. about 10% of the $AlCl_3$ will condense and generally yield satisfactory results.

The gas stream now contains, in addition to the combustion gases and inerts, aluminum chloride in large concentration, silicon tetrachloride also in large concentration and titanium tetrachloride in lesser concentration. This stream is passed into a vessel where it contacts a stream of sodium chloride-rich aluminum chloride complex ($NaCl-AlCl_3$) which reacts its excess sodium chloride to form the compound $NaAlCl_4$. Some other alkali chloride may of course be substituted for the NaCl. The reaction reduces the aluminum chloride vapor pressure. Since this is an ionized compound, the solubility of both titanium and silicon tetrachloride, covalent compounds, is greatly reduced and will approach complete insolubility which is necessary to meet the purity required of the aluminum oxide for cell use.

This process is described in greater detail in copending and concurrently filed U.S. patent application Ser. No. 255,355 filed Dec. 1, 1981 entitled "Purification of Aluminum Chloride" in the name of Wendell E. Dunn, Jr. According to this process the gas stream emerging from the chlorinator is treated by a process comprising the steps of:

1. absorbing the aluminum chloride contained in the gas stream under high temperature conditions with an alkaki chloride or alkali metal chloride mixture to form an ionic alkali chloride-aluminum chloride complex and 2. selectively condensing the impurity chlorides from the product of step (1) to produce a purified aluminum chloride-alkali-metal chloride complex suitable for direct use in an aluminum chloride reduction cell.

This improved method for separating the aluminum chloride from the chlorinator gas stream with its chloride impurities is favorably affected not only by increasing the aluminum chloride boiling point, but by a change in the chemical nature of the aluminum chloride.

When absorbed with the alkali chloride to form a complex salt, the aluminum chloride changes from a covalent salt to a highly ionic salt. The uncomplexed (i.e. covalent) impurities in the gas stream remain in their original highly covalent state and exhibit extremely high apparent relative activities in the melt as compared to their activities in a liquid or solid solution of covalent (i.e. uncomplexed) aluminum chloride. This relative increase in activity, in concert with the much higher temperature of condensation of the aluminum chloride values permits reduction of the impurity level in the aluminum chloride complex by more than an order of magnitude below the impurity level in the solid solution of uncomplexed (i.e. covalent) aluminum chloride.

Not wishing to be bound by theory, I believe that the complexed aluminum chloride in a 1/1 or higher alkali chloride-$AlCl_3$ ratio is entirely in the ionic form and that the rejection of a covalent molecule from either the melt or the solid solution enhances the apparent relative activity of these covalent impurities.

Similarly, the formation of the ionic complex binds the aluminum chloride so tightly that the vapor pressure is reduced several orders of magnitude over pure (i.e. uncomplexed) aluminum chloride. Consequently, the separation of aluminum chloride from the chlorinator gas stream can be accomplished at a much higher temperature than that used in the case where the pure uncomplexed aluminum chloride is condensed and separated from the gas stream.

In the process, the heat released from the condensation and exothermic complexing raises reaction temperature of the mix without the introduction of further heat (a very difficult process under these corrosive conditions). This temperature increases the saturation vapor pressures of the impurity chlorides and decreased their solubility in the aluminum chloride complex thereby enhancing the efficiency of the separation process.

One can condense the higher boiling impurity chlorides at a temperature above the aluminum chloride condensation temperature and then have the advantage of an increased product condensation temperature and the added advantage of internally generated heat which allows the increased condensation temperature for aluminum chloride values to be used to advantage.

The complexing alkali metal chloride may be a lithium, sodium or potassium chloride as used in a reduction cell thereby permitting recycling of depleted cell melt to the absorption stage. The heat from the cell melt alkali metal chloride can be used to further add to the condensation stage temperature and may be adjusted by cooling the returning cell melt chloride to any desired temperature where the impurity level is acceptable. This will reduce vaporization losses of the alkali metal complex, though they are quite low in any case.

Among the advantages to the use of complexed aluminum chloride in the production of aluminum metal by the electrolysis of aluminum chloride is an improvement in the cell addition. The difficulties of addition of a subliming solid to a high temperature cell bath has been described in U.S. Pat. No. 4,111,764. Complexing aluminum chloride with an alkali halide allows addition to the reduction cell of a liquid of reasonable melting point and high boiling point thus, eliminating the problems of aluminum chloride plugging and vaporization which are common in aluminum chloride electrolytic processes.

The decrease in melt temperature which occurs on dissolution of aluminum chloride in spent cell melt allows the transporting pipes to and from the cell to be cooled to prevent corrosion while allowing the much lower melting complex to be handled and flow controlled easily. It may also be stored for reasonable lengths of time before distribution to individual pot line cells. Handling as a liquid reduces the possibility and extent of hydrolysis, the possibility of reducing the surface area and the possibility of contact with water vapor.

The liquid $NaAlCl_4$ contains the aluminum chloride values which are to be oxidized in the next stage. The gas stream stripped of $Al_2Cl_6$ contains valuable titanium tetrachloride and silicon tetrachloride. These can be condensed and separated by distillation. If desired, the silicon tetrachloride may be returned to the cloud reactor of the first chlorinator for oxidation or to the inlet gas stream of the first chlorinator or to the second chlorinator where it is possible to suppress the silicon reaction and react the chlorine values of $SiCl_4$ to $FeCl_3$.

The liquid $NaAlCl_4$ is passed into a pebble reactor where it is contacted with oxygen at temperatures above 500° C. under conditions of high shear. Here the reaction takes place growing crystals of alumina which are broken off from the tabular pellets which form the pebbles of the reaction medium and elutriated along with the salt crystals from the reactor. The salt and any unreacted aluminum chloride are complexed (and solid) and are cooled with the gas stream in a flue cooler to a temperature where the chlorine may be recycled to the second chlorinator. The pressure of the oxidizer is above that of the second chlorinator so that the gas can be reinserted into the reactor without process pressurization. Before entry, the solids containing the product alumina and salt along with any unreacted $AlCl_3$ complexed with the salt are cycloned from the recycle $Cl_2$ stream and then elutriated. The elutriated salt is recycled into the absorber where it contacts additional aluminum chloride.

The process to convert alkali chloride complexed aluminum chloride to alumina crystals depends upon a fluidized bed reactor of large particle size (i.e. above about 1/16" in average diameter), fluidized at high gas velocities (above about 8'/sec.) and operating with a liquid phase. Although it is generally thought that fluidized beds must have low particle size so that fluidization will be smooth, I have discovered that this is a misconception.

The phenomenon of fluidization is a broad effect which can be observed in many natural processes at far larger particle size than currently practiced in chemical reactors. Volcanoes have been known to fluidize rocks, the fluidizing of grapefruit-sized hail is a frequent phenomenon observed in violent thunderstorms.

Such hail is really part of a fluidized system occurring in the thunderhead cloud as evidenced by the layered structure build up in numerous trips from lower to higher regions of the cloud.

In my aluminum chloride oxidizer the particles used are tabular alumina pebbles large enough to require a fluidization velocity that will cause high shear on the liquid layer; particles large enough so that the numerous energy absorbing interparticle contacts total small energy losses compared to the total mechanical energy imparted to the system by the high velocity of reactant and produce gases.

The fluidized reactor can be constructed either with heat transmitting walls or as an adiabatic reactor, depending upon the reaction temperature desired. In the case of the aluminum chloride oxidation at low temperature, it is desirable to keep the reactor temperature below the melting temperature of the alkali chloride used in the complex or above about 500° C. The walls of small reactors can be of sufficient area to provide the necessary heat transfer surface. For larger reactors, internal heat transfer surface may be necessary. Alternatively, a multiple bank of smaller reactors can be substituted.

Feed of solid complex to the reactor can be through the gas feed system. Liquid feed can be injected through openings in the reactor wall at any of a variety of convenient points. The reaction which takes place at the entrance point is minimal and any deposit which might build up is abraded by the wall-bed pebble contact which avoids plugging.

Heat-up of the reactor can be accomplished by introducing a gas-oxygen mixture such as Selas gas or by burning carbon with air or $N_2/O_2$ mixtures. Heat can also be transferred to and from the reactor by circulation of the pebbles to a heating or cooling zone.

Preparation of the aluminum chloride complex is important only with regard to impurity level. There may be an excess of either aluminum or alkali chloride in the complex, and the complex may be fed to the reactor in either solid or liquid form. The acceptable impurity level for the feed will be determined by the impurity level which can be tolerated for the cell feed. Normally this level will be below about 0.01% by weight.

In removing aluminum chloride gas from the chlorinator exit gas stream, it is convenient to form the alkali metal complex as an aid to separation, but this method can be used only if the aluminum chloride is pure, i.e. the gas stream at separation does not contain condensible impurities such as iron chlorides which will condense and form complexes with the aluminum chloride. In the case of chlorination of pure Bayer aluminas, as is presently commercially practiced, the aluminum chloride in the chlorinator stream can be complexed directly.

In the situation where the aluminum chloride feed is derived from an aluminous ore chlorination, large amounts of impurities including iron, titanium and silicon tetrachloride may be in the gas phase. In this situation, it is necessary to prevent the formation of an iron chloride/aluminum chloride complex which condenses near enough in temperature to the aluminum chloride to permit unacceptable impurity contamination of the condensed aluminum chloride-alkali chloride complex.

Preparation of the aluminum chloride complex from a chlorinator stream containing typical impurities associated with aluminous ores such as bauxite or kaolinite can be accomplished as described above.

The alumina product having been separated by elutriation from the salt is washed to remove the last traces of salt and dried. The crystals are platelets of nearly 0.01–1 mm size having very little surface area and of high single crystal purity. At higher oxidizer temperatures more gas phase reactions will take place increasing the ratio of fines in the product $Al_2O_3$.

The following examples will illustrate the steps of the process. For simplicity of operation the process which would normally at plant scale be operated as a continuous process is broken into several steps at pilot plant scale.

Example I—Drying and Calcination

Bauxite ore of analysis shown in Table 1 under "as received" is dried in a rotary kiln to remove all moisture and about half of the combined hydroxyls (LOI) by heating to a temperature of 250° C. This dried ore becomes the feed for fluidized bed calcination which removes the remaining hydroxyls as water to complete the removal of chlorine-consuming hydrogen in the ore feed to the chlorinator.

The fluidized bed reactor is a 5.5' ID, refractory lined 7' mild steel shell with a multipoint distributor in a flat bottom. An overflow at two feet allows continuous feed and bed removal. Dried air and oxygen are fed to the gas distributor to maintain a reactor temperature of about 1100° K. The pre-dried ore (analysis shown in Table I) is fed at 27.3 lbs./min. with carbon feed of 3.2 lbs./min. which burns to $CO_2$. Depending upon the carbon size and nature, dust losses will vary. Sufficient carbon is added to maintain a few percent excess in the overflow. The fluidized bed velocity is higher than subsequent bed velocities to provide elutriation of dust before the chlorination stages. Great Lakes Petroleum coke 8×50 mesh is used.

The calcining fluidized bed is operated at atmospheric pressure with a superficial gas velocity of 0.7'/sec. The bed area is 23.76 ft.$^2$. The refractory lining allows shell heat losses at 1100° K. of about 42,000 pcu/hr.

The output of this stage is 22.6 lbs./hr. with a composition analysis shown in Table I under "ignited ore". The overflow ore and coke are cooled in a 4' dia. water-cooled fluidized bed to below 140° C. and collected in a bin. After cooling to ambient temperature, the ignited ore is separated from the carbon by sieving with a Klason vibrating sieve and stored as the next process step feed.

The ignition at 1100° K. removes all but insignificant amounts of water and hydroxyls but does not cause the higher density change which occurs about 100° to 200° C. higher.

Example II—1st Chlorination

It is the purpose of this step to remove nearly all of the iron without chlorinating significant amounts of the titanium or aluminum. It is known that titanium tetrachloride will replace iron oxide rapidly and advantage is taken of this to avoid the loss of titanium by leaving a small concentration of iron in the partially chlorinated ore product.

The first chlorination is conducted with preheated ore to meet heat balance requirements. The preheater described in the preceeding example is operated at about 0.7'/sec. superficial velocity with an oxygen/nitrogen ratio not exceeding 40%/60%. The preheater operating temperature for chlorinator heat balance is about 1000° K.

Ignited ore from the previous reaction mixed with 10% by wt. carbon is fed cold to the preheater at 20 psia pressure. The bed overflows the 2' level opening into a transfer fluidized bed of 20" diameter and is transported from this bed into the 1st chlorinator. Exit pressures of both reactors are valved in order to hold a few tenths of a pound differential pressure to avoid chloride back flow or excessive combustion gas flow through into the chlorinator. Table II gives the feeds and operating conditions for the preheater and iron chlorinator. Temperatures are measured by thermocouples on quadrature. Those of the chlorinator are at a 45° angle with horizontal just touching the static bed top surface and covered by the expanded bed when fluidized.

The first chlorinator is operated so that the iron chloride output is substantially all ferric chloride. Samples can be taken from the gas space above the bed during chlorination provided the oxidation cloud oxygen is momentarily shut off and the gas space allowed to purge. The combustion gas is essentially all carbon dioxide.

The overflow solids are cooled in an air fluidized bed reactor before dropping to atmospheric pressure through a long conveying line and a second pressure reducing bed.

Example III

The cloud oxidation of ferric chloride produced in the 1st chlorinator is conducted directly above the fluidized bed where the first chlorination is conducted. The upper part of the reactor is bare as is the top. These are protected by water cooling and form a film of solid ferric chloride which protects the mild steel wall completely.

Oxygen is introduced through a tangential jet about four feet above the bed overflow port and the gases and solids leave from the center of the top into a scrubbed 3" stainless steel water cooled flue horizontally disposed.

Table III gives the cloud operating conditions. The unreacted ferric chloride is condensed and recirculated with the incoming oxygen stream to remove heat from the cloud. A wide variation in temperature is possible; oxygen concentration variation can be used to control the cloud operating temperature.

The first flue section 60 feet long has a variable water cooled area to enable the gas end temperature to be held above the ferric chloride condensation temperature. The scrubbing sand and the ferric oxide formed by the oxidation reaction are removed by cyclone, the ferric chloride vapor passes to a vertically disposed mild steel flue of 5' diameter also water cooled over the entire length. The second flue is scrubbed by sand which is removed with the ferric chloride solids by cyclone. The fine ferric chloride is elutriated from the sand and recycled by oxygen transport to the cloud continuously.

The fluidized beds are heated with oxygen and air mixtures after lift off and brought to temperature without chlorine. Upon reaching operating temperatures in both reactors, the chlorine flow is started after the solids flow has been established through the chain of two reactors with a transfer leg and cooler. After chlorine flow is established, replacing the air-oxygen of the heat up of the second reactor, oxygen is sent into the cloud reaction space and the gases move into the flues and deliver their solids. As the cloud temperature drops, indicating ferric chloride recycle cooling, the oxygen flow is adjusted to maintain an 1150° K. cloud temperature.

The interior wall of the unlined cloud reaction space becomes covered with ferric chloride and limits the cooling, but equilibrium is reached very quickly. The cloud gas retention time is about 40 seconds. At temperatures below 800° C. the cloud reaction becomes unstable and equilibrium is not acheived. Table III gives two operating conditions in the stable temperature region.

Example IV

The second chlorinator is operated at 1300° K. with feed from the first chlorinator which is beneficiated with respect to its iron content. After a first chlorination with cooling and carbon separation, the beneficiated ore is mixed with 30 wt.% of carbon and preheated in the above mentioned preheater to 1300° K. Table IV gives the operating conditions and feed streams. The preheater is operated above the velocity of the subsequent chlorinator to reduce dusting from the chlorination step.

The second chlorination with the associated ore preheat are conducted in the same reactors described above. Heat balance is achieved by preheating the solids, and temperature control is achieved by oxygen addition to input gas streams. Over-feeding is practiced to provide a constant bed level and constant ore concentrations in the chlorinator and to allow an output stream for sampling.

After the reactors are brought to temperature, chlorine flows are started replacing heat up gas flows and temperatures are adjusted. Solids flows can be started before chlorine input to adjust bed levels to over-flow.

For catalytic effect, aluminum chloride recovered from its partial condensation prior to the absorption of aluminum chloride into its salt complex $NaAlCl_4$ is added to the chlorinator inlet gas stream where it sublimes and enters the reactor with the reactant gases to provide an initial aluminum chloride concentration at the chlorine inlet to the bed.

Example V

The chlorides and combustion gases from the chlorinator of Example IV pass from the fluidized chlorinator bed into the gas space above and thence to a 3" stainless steel water cooled flue with a variable length to allow adjustment of cooling area and control of terminal gas stream temperature.

In the gas space above the bed before the gas enters the flue, it is contacted with fine iron powder which reduces the ferric chloride and reacts with any excess chlorine which has passed through the bed. The purpose of the reduction is to convert aluminum chloride/iron chloride complexes to the higher boiling ferrous species which may be removed before product aluminum chloride collection. Table V gives the operating conditions of the cooling flues. The condensed solids and scrub solids are collected in a cyclone. They are suitable for injection into the cloud oxidation stage to recover chlorine values.

The uncondensed chlorides with combustion and inert gases pass from the cyclone into a fluidized bed condenser where glass beads or other suitable inert surface is fluidized at about 1' sec. The condenser is water cooled with water in tubes so that the water flow and temperature may be controlled. The condenser operating temperature is adjusted by water flow so that about 20% of the aluminum chloride (now dimerized) is condensed and swept from the condenser by the uncondensed gases. The condensed aluminum chloride is cycloned out of the gas stream in an insulated cyclone. The rate of condensation is measured by weight of aluminum chloride collected. This is collected at the rate of 5-8 lbs. per minute. The impure aluminum chloride may be recirculated by introduction into the second chlorinator either above or below the bed.

The product containing gases pass from the insulated cyclone in a 3" stainless steel pipe where they are contacted by fine salt crystals in a vertically disposed pipe and then into a 1" ceramic raschig ring packed bed where the gases and liquid $NaAlCl_4$ flow cocurrently down over the packing to complete the absorption and complex formation by the $AlCl_3$ values. There is no heat removal from the pipe of the packed bed so that the gases are at increased temperature due to reaction heat when the liquid complex is separated by cyclone. The silicon tetrachloride-titanium tetrachloride inerts and combustion gases are separated from the liquid complex and quenched before being released to the atmosphere. The pressure of the system is regulated by valving the cooled exit gases.

Example VI

The absorbed aluminum chloride product as the $NaAlCl_4$ complex of the preceeding example is collected in a standpipe to pressurize it for injection into the aluminum chloride oxidation reactor. At the entrance to the reactor a valve regulates $NaAlCl_4$ entrance into the reactor and holds a level in the standpipe. The $NaAlCl_4$ complex is oxidized to alumina and sodium chloride solid products and chlorine gas is recovered according to the reaction $2NaAlCl_4 + 1\frac{1}{2}O_2 \rightarrow Al_2O_3 + 3Cl_2 + 2NaCl$. Table VI shows the operating conditions. The reactor is a vigorously fluidized pebble bed of tabular alumina pebbles. The products of the reaction are abraded from the pebble surface where they are formed and collected after flue cooling in a cyclone. The reactor temperature is held down below 800° C. by water cooling the walls so that the products of the reaction are all solids. Pressure control is obtained by valving the exiting chlorine stream. Inlet oxygen is used to fluidize the pebbles in the cone below the salt complex inlet point.

Following the cyclone collection and cooling of the solid products, the salt is separated from the alumina by elutriation for recycle. The product alumina is washed free of chlorides and dried.

These examples represent individual steps in the process adjusted in scale to fit pilot plant apparatus. In commercial practice the process steps are operated continuously from the calcination to the oxidation of the complex $NaAlCl_4$ to obtain recycle chlorine values and the product alumina. The collection of titanium and silicon tetrachloride from the gas stream after aluminum chloride values have been extracted by condensation or other commercially practiced methods is expected. The sale of one or both of these chlorides as by products is likely, otherwise they can be recycled to the cloud reactor and oxidized with the iron chloride. Salt recovered from the product separation step is likewise recycled.

The addition of iron powder to reduce the ferric chloride to ferrous chloride and to capture the chlorine which escapes the bed recovers these chlorine values through the subsequent oxidation in the cloud reactor. The iron oxide product from this oxidation may be reduced to provide the small amounts of iron powder needed. However, since the ferrous chloride formed tends to complex to some extent with aluminum chloride, it is desirable to hold the break through chlorine to a minimum. This may be accomplished by increased bed depth and carbon concentration in the second chlorinator.

It is also noted that it is advantageous to restrict the amount of iron present in the outlet stream from the second chlorinator where aluminum chloride will be present. Thus, adjustment of the extent of iron removal from the 1st chlorinator is desirable. Individual bauxites will have differing points at which titanium values will come off from the 1st stage of chlorination, and this combined with the value of sacrificing the titania values will determine how little iron will be permitted into the second stage chlorination.

The apparently insuperable problem of condensing iron chlorides without losing complexing aluminum chloride with them can be greatly alleviated by the use of two stage chlorination with the added benefit that a cloud oxidation reaction can be accomplished simultaneously to recover all the chlorine values of the impurity chlorides which can be oxidized.

TABLE I

Ore Analyses

| | "As Received" Wt. % | "Kiln Predried" | "Ignited" |
|---|---|---|---|
| $Al_2O_3$ | 44.77 | 64.68 | 78.27 |
| $SiO_2$ | 2.90 | 4.19 | 5.07 |
| $TiO_2$ | 1.24 | 1.79 | 2.17 |
| $Fe_2O_3$ | 8.29 | 11.98 | 14.49 |
| LOI | 24.04 | 17.36 | |
| $H_2O$ | 18.75 | | |

TABLE II

Flow and Operating Conditions of Preheater and 1st Chlorinator

| | Preheater | 1st Chlorinator |
|---|---|---|
| Feed Ore | 163.2 16/min. "ignited ore" | Preheater overflow |
| Feed Carbon | 16.3 16/min. Petroleum Coke | Preheater overflow |
| Gas Input | | |
| $O_2$ | 150 scfm | 15.8 scfm |
| $N_2$ | 225 scfm | — |
| $Cl_2$ | — | 156.5 scfm |
| Pressure | 20 psia | |
| Temp. | 1000° K. | 1200° K. |
| Superficial Bed Vel | .7'/sec. | .4'/sec. |
| Output Solids (Carbon Free Basis) | | |
| $Al_2O_3$ | 78.27% | 91.23% |
| $SiO_2$ | 5.07 | 5.91 |
| $TiO_2$ | 2.17 | 2.53 |
| $Fe_2O_3$ | 14.50 | .29 |
| lbs./hr. | | |
| Output Gas | To atmosphere | To cloud reaction |

TABLE II-continued

Flow and Operating Conditions of Preheater and 1st Chlorinator

| | Preheater | 1st Chlorinator |
|---|---|---|
| | $CO_2$, $N_2$ | $FeCl_3$, $CO_2$, $N_2$ |

TABLE III

Oxidation Cloud Operating Conditions

| Temp. | 1150° K. | 1135° K. |
|---|---|---|
| Pressure | 20 psia | 20 psia |
| $O_2$ input | 100 scfm | 93 scfm |
| $FeCl_3$ input | 17.43 mols/hr. | 17.43 mols/hr. |
| $CO_2$ input | 15.72 mols/hr. | 15.72 mols/hr. |
| $O_2/Cl_2$ output gas | .142 | .907 |

TABLE IV

2nd Chlorination Operating Condition

| | Preheater | 2nd Chlorinator |
|---|---|---|
| Temp. | 1300° K. | 1300° K. |
| Pressure | 20 psia | 19.7 psia |
| Gas Vel | .5'/sec. | .4'/sec. |
| Gas Input | | |
| Air | 255 scfm | 20 scfm |
| $O_2$ | As needed | $O_2$ enriched air |
| $Cl_2$ | — | 185 scfm |
| Ore feed | 20 lbs./min. | Overflow from preheater |
| Coke feed | 6 lbs./min. | Overflow from preheater |
| Recycle $AlCl_3$ solids | 4 lbs./min.* | |
| Ore output | Overflow to Chlor. | Overflow to cooler |
| Coke output | Overflow to Chlor. | Overflow to cooler |
| Gas output | | |
| $CO_2/CO$ | All $CO_2$ | 3/1, $CO_2/CO$ |
| $Cl_2$ | — | <2% |
| Chlorides | — | $AlCl_3$, $SiCl_4$, $TiCl_4$, $FeCl_3$ |
| Bed carbon/ore | 20% | 20% |
| Bed overflow to cooler Ore + coke | | Approx. 100 lbs./hr. |

*Added into chlorine gas input stream

TABLE V

Condensation Stages' Operating Conditions

| | Flue #1 | Middling Condenser | $Al_2Cl_6$ Absorber |
|---|---|---|---|
| Inlet Temp. | 1300° K. | 523° K. | |
| Outlet Temp. | 523° K. | 433-434° K. | |
| Length | 60' | | |
| (1) ia (Schedule 40 316 S.S.) | 3" | | |
| Scrub Solids As needed | | 8 × 20 mesh coke | |
| Inlet Pressure | 19.7 psia | | |
| Cyclone (Water Cooled) | 18" dia. | | |
| Water Flow Rate | | 3-4 gpm | |
| Condensed $AlCl_3$ (impure) | | 5-8 lbs./min. | |
| Cyclone (insulated) Inlet Temp. Gases | | 18" dia. | 433° K. |
| Outlet Temp. $NaAlCl_4$ | | | 250° C. |
| NaCl Added | | | 16 lbs./min. |

TABLE VI

Aluminum Chloride Complex Oxidation Operating Conditions

| Inlet Pressure | 19.7 psia |
|---|---|
| Reactor Temp. | 782° |

TABLE VI-continued

| Aluminum Chloride Complex Oxidation Operating Conditions | |
|---|---|
| $O_2$ Feed | 165 scfm |
| % Excess $O_2$ | 10% |
| Vel | 10'/sec. |
| Reactor Dimensions | |
| 12" dia., 60° cone | |
| 4' body, 14" dia. | |
| 2' free board. | |
| 20 ft.² water cooled area | |
| Product $Al_2O_3$ | |
| $TiO_2$ < 20 ppm | |
| $SiO_2$ < 5 ppm | |
| Fe < 100 ppm | |

What is claimed is:

1. A method for producing alumina from a material containing alumina, titania, silica and iron values via a chlorination step which process comprises the steps of:
   (A) dehydrating the material at a temperature of between about 500° and 1300° K.;
   (B) chlorinating the product of step (A) in the presence of chlorine and carbon at a temperature below about 1200° K. and under conditions which provide chlorination of a majority of the iron present in the material without substantial chlorination of titania values present therein with concommittant formation of an iron chloride cloud above the surface of the chlorination reaction mixture;
   (C) introducing oxygen into the iron chloride cloud under conditions to cause oxidation of a majority of the iron chloride contained in the cloud;
   (D) chlorinating the non-gaseous product of step (B) in the presence of chlorine and carbon at a temperature above about 1300° K. but below the fusion temperature of silica containing components and under conditions sufficient to chlorinate substantially entirely the alumina, titania and silica values contained therein;
   (E) reducing and condensing any iron chloride contained with the aluminum chloride in one or more partial iron chloride condensation stages;
   (F) absorbing the aluminum chloride under high temperature conditions with an alkali chloride or mixture of alkali chlorides to form an ionic alkali metal aluminum chloride complex;
   (G) selectively condensing any impurity chlorides contained in the product of step (F) to produce a purified aluminum chloride-alkali chloride complex;
   (H) oxidizing the alkali metal/aluminum chloride complex with oxygen at a temperature above about 500° C. in a fluidized bed pebble reactor; and
   (I) separating the solid alumina product.

* * * * *